US012732739B2

(12) United States Patent

Kegler et al.

(10) Patent No.: US 12,732,739 B2

(45) Date of Patent: Sep. 8, 2026

(54) WEARABLE DEVICE WITH ENHANCED NOISE SUPPRESSION

(71) Applicant: BOSE CORPORATION, Framingham, MA (US)

(72) Inventors: Mikolaj Aleksander Kegler, London (GB); Marko Stamenovic, Truro, MA (US); Li-Chia Yang, Chelmsford, MA (US); Alexander D. Pawlicki, Newbury, MA (US); Bryce Irvin, Brooklyn, NY (US); Carl Jensen, Waltham, MA (US); Amir Reza Moghimi, Auburndale, MA (US); Luke Calvin Walters, Alton, NH (US)

(73) Assignee: Bose Corporation, Framingham, MA (US)

(*) Notice: Subject to any disclaimer, the term of this patent is extended or adjusted under 35 U.S.C. 154(b) by 188 days.

(21) Appl. No.: 18/673,192

(22) Filed: May 23, 2024

(65) Prior Publication Data

US 2025/0365527 A1 Nov. 27, 2025

(51) Int. Cl.

*H04R 1/10* (2026.01)
*G10K 11/175* (2006.01)
*H04R 3/00* (2006.01)
*H04R 29/00* (2006.01)

(52) U.S. Cl.

CPC ......... *H04R 1/1083* (2013.01); *G10K 11/175* (2013.01); *H04R 3/005* (2013.01); *H04R 29/001* (2013.01); *H04R 2460/01* (2013.01)

(58) Field of Classification Search

CPC .... H04R 1/1083; H04R 3/005; H04R 29/001; H04R 2460/01; G10K 11/175; G10L 21/0208

See application file for complete search history.

(56) References Cited

U.S. PATENT DOCUMENTS

| | | | | |
|---|---|---|---|---|
| 11,045,123 | B2 * | 6/2021 | Honore | A61B 5/1455 |
| 11,937,047 | B1 * | 3/2024 | Lovchinsky | H04R 25/407 |
| 12,254,892 | B2 * | 3/2025 | de la Rey | G10L 25/30 |
| 12,272,369 | B1 * | 4/2025 | Chhetri | H04M 9/08 |
| 2018/0033449 | A1 * | 2/2018 | Theverapperuma | G10L 25/30 |
| 2020/0374647 | A1 * | 11/2020 | Cappello | G06V 40/171 |

(Continued)

OTHER PUBLICATIONS

International Search Report and Written Opinion dated Jul. 7, 2025 for Application No. PCT/US2025/030254, 11 pages.

(Continued)

*Primary Examiner* — Oyesola C Ojo

(74) *Attorney, Agent, or Firm* — Patterson + Sheridan, LLP

(57) ABSTRACT

Techniques, including devices and systems implementing the techniques, for using enhanced noise suppression to provide optimal denoised output. One example system generally includes a device of a user, a first sensor coupled to the device, a second sensor coupled to the device, and one or more processors coupled to the device. The one or more processors are generally, individually or collectively, configured to receive, at the first sensor, a first audio signal with a first degradation, receive, at the second sensor, a second audio signal with a second degradation, where the first degradation is different than the second degradation, and determine an output audio signal using the first audio signal and the second audio signal.

13 Claims, 11 Drawing Sheets

(56) References Cited

U.S. PATENT DOCUMENTS

| | | | | |
|---|---|---|---|---|
| 2023/0162758 | A1* | 5/2023 | Borgstrom | G10L 25/24<br>704/200 |
| 2024/0129674 | A1* | 4/2024 | Casper | G10L 21/0208 |
| 2024/0194214 | A1* | 6/2024 | Fang | G10L 21/02 |
| 2024/0331715 | A1* | 10/2024 | Lee | G10L 21/0232 |
| 2024/0331716 | A1* | 10/2024 | Bean | G06F 1/163 |
| 2025/0048043 | A1* | 2/2025 | Lovchinsky | H04S 7/303 |
| 2025/0259641 | A1* | 8/2025 | de la Rey | G10L 21/0272 |

OTHER PUBLICATIONS

Zhang et al., "A Speech Enhancement Algorithm by Iterating Single- and Multi-Microphone Processing and Its Application to Robust ASR", 2017 IEEE International Conference on Acoustics, Speech and Signal Processing (ICASSP), 2017, pp. 276-280.

Wang et al., "Multi-Modal Speech Enhancement with Bone-Conducted Speech in Time Domain", Applied Acoustics, vol. 200, Nov. 2022, 7 pages.

* cited by examiner

WEARABLE DEVICE WITH ENHANCED NOISE SUPPRESSION

FIELD

Aspects of the disclosure generally relate to wearable devices, and, more particularly, to techniques to enable a wearable device to provide improved output audio by utilizing enhanced noise suppression.

BACKGROUND

Wearable devices such as headphones commonly provide for two way communication, in which the device can both capture audio that may include user speech and output audio that includes the user speech to other devices. To capture user speech, the device may use one or more microphones located somewhere on the device. However, background noise may also be present in the captured audio. For example, the microphones used to capture user speech may also capture background noise that may include speech from other speakers (e.g., other people speaking near the user), as well as other unwanted non-speech noise (e.g., sneezing, crying, laughing, or other ambient noise present in the environment surrounding the device). As a result of the presence of background noise in the captured audio, the wearable device may produce suboptimal output audio.

Accordingly, methods for providing improved output audio, as well as apparatuses and systems configured to implement these methods, are desired.

SUMMARY

All examples and features mentioned below can be combined in any technically possible way.

Aspects of the present disclosure provide a system. The system includes a device of a user; a first sensor coupled to the device; a second sensor coupled to the device; and one or more processors coupled to the device. The one or more processors, individually or collectively, are configured to: receive, at the first sensor, a first audio signal with a first degradation; receive, at the second sensor, a second audio signal with a second degradation, where the first degradation is different than the second degradation; and determine an output audio signal using the first audio signal and the second audio signal.

In aspects, the first sensor includes a microphone outside the device and the second sensor includes: a feedback microphone; a voice band accelerometer; or an inertial measurement unit.

In aspects, the one or more processors, individually or collectively, are configured to determine the output audio signal by using a trained machine-learning model to determine a first mask for the first audio signal and a second mask for the second audio signal, where the first mask is configured to at least partially denoise the first audio signal and the second mask is configured to at least partially denoise the second audio signal.

In aspects, the one or more processors, individually or collectively, are further configured to determine the output audio signal by: applying the first mask to the first audio signal to produce a denoised first audio signal; applying the second mask to the second audio signal to produce a denoised second audio signal; and summing the denoised first audio signal and the denoised second audio signal to produce the output audio signal.

In aspects, the one or more processors, individually or collectively, are configured to determine the output audio signal by using a trained machine-learning model to determine a mask for the first audio signal, the mask being configured to at least partially denoise the first audio signal.

Aspects of the present disclosure are directed to a method for audio signal processing in a device of a user. The method for audio signal processing in a device includes receiving, at a first sensor coupled to the device, a first audio signal with a first degradation; receiving, at a second sensor coupled to the device, a second audio signal with a second degradation, where the first degradation is different than the second degradation; and determining an output audio signal using the first audio signal and the second audio signal.

In aspects, the second sensor includes: a feedback microphone; a voice band accelerometer; or an inertial measurement unit.

In aspects, the first sensor includes a microphone outside the device.

In aspects, determining the output audio signal includes using a trained machine-learning model to determine a first mask for the first audio signal and a second mask for the second audio signal, where the first mask is configured to at least partially denoise the first audio signal and the second mask is configured to at least partially denoise the second audio signal.

In aspects, determining the output audio signal further includes: applying the first mask to the first audio signal to produce a denoised first audio signal; applying the second mask to the second audio signal to produce a denoised second audio signal; and summing the denoised first audio signal and the denoised second audio signal to produce the output audio signal.

In aspects, determining the output audio signal includes using a trained machine-learning model to determine a mask for the first audio signal, the mask being configured to at least partially denoise the first audio signal.

In aspects, determining the output audio signal further includes: applying the mask to the first audio signal to produce a denoised first audio signal; and summing the denoised first audio signal and the second audio signal to produce the output audio signal.

In aspects, the method further includes preprocessing the second audio signal, where the preprocessing includes effectively removing a non-user speech component of the second audio signal.

In aspects, the first audio signal and the second audio signal each include a speech component originating from the user.

In aspects, the device includes a wearable device.

Aspects of the present disclosure a non-transitory computer-readable medium includes computer-executable instructions that, when executed by one or more processors of a device, cause the device to perform a method for audio signal processing. The method includes: receiving, at a first sensor coupled to the device, a first audio signal with a first degradation; receiving, at a second sensor coupled to the device, a second audio signal with a second degradation, where the first degradation is different than the second degradation; and determining an output audio signal using the first audio signal and the second audio signal.

In aspects, the first sensor includes a microphone outside the device and the second sensor includes: a feedback microphone; a voice band accelerometer; or an inertial measurement unit.

In aspects, determining the output audio signal includes using a trained machine-learning model to determine a first mask for the first audio signal and a second mask for the second audio signal, where the first mask is configured to at least partially denoise the first audio signal and the second mask is configured to at least partially denoise the second audio signal.

In aspects, determining the output audio signal further includes: applying the first mask to the first audio signal to produce a denoised first audio signal; applying the second mask to the second audio signal to produce a denoised second audio signal; and summing the denoised first audio signal and the denoised second audio signal to produce the output audio signal.

In aspects, determining the output audio signal includes using a trained machine-learning model to determine a mask for the first audio signal, the mask being configured to at least partially denoise the first audio signal.

Two or more features described in this disclosure, including those described in this summary section, may be combined to form implementations not specifically described herein.

The details of one or more implementations are set forth in the accompanying drawings and the description below. Other features, objects, and advantages will be apparent from the description and drawings, and from the claims.

BRIEF DESCRIPTION OF THE DRAWINGS

Like numerals indicate like elements.

DETAILED DESCRIPTION

Figure 1:
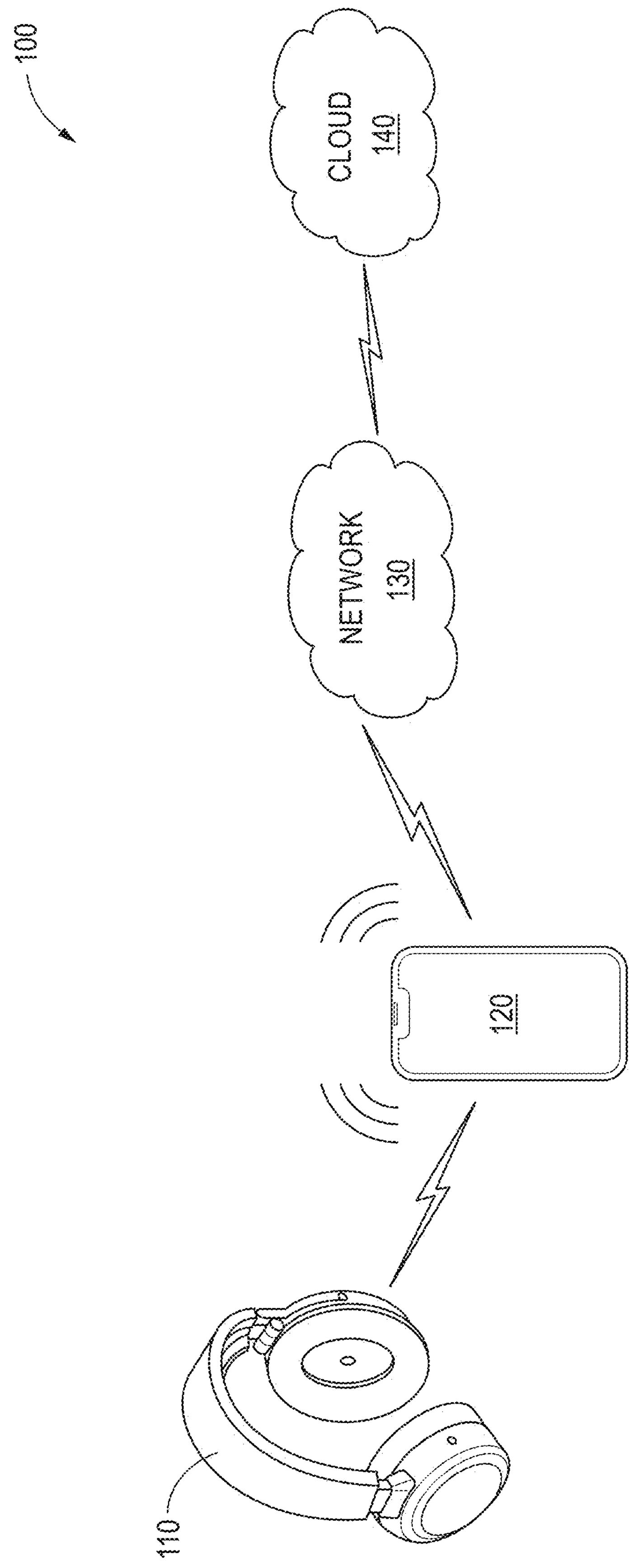
FIG. 1 illustrates an example system, in which aspects of the present disclosure may be implemented.

Certain aspects of the present disclosure provide techniques, including devices and systems implementing the techniques, for using enhanced noise suppression to provide optimal denoised output. Such techniques may involve receiving (e.g., capturing) audio signals at two or more sensors included in a device, each of the audio signals having different degradation based at least in part on the location of the sensors. For example, one sensor may be implemented by a sensor located outside of the device (e.g., outside sensor), and another sensor may be implemented by an internal sensor (e.g., a bone conduction sensor and/or transducer), and therefore the internal sensor may be at least partially shielded from background noise and receive a cleaner (e.g., less noisy) audio signal than the outside sensor. Each of the audio signals may be degraded differently. For example, the audio signal received by the outside sensor may be degraded primarily by additive noise and the audio signal received by the sensor implemented by the internal sensor may be degraded primarily by bandwidth limiting and time-varying filtering. The received audio signals may include speech from a user of the device. The device may be configured to determine and output an optimal denoised output audio signal that includes the user speech using the first audio signal and the second audio signal. In certain aspects, the device may determine the optimal denoised output audio signal by using a trained machine-learning model configured to at least partially denoise and/or combine the first audio signal and/or the second audio signal.

Many wearable devices may employ a denoising system configured to denoise an input audio signal (e.g., an audio signal received at one or more sensors of the wearable device) and provide a denoised output audio signal (e.g., an audio signal for transmission to another device). This type of denoising system may function admirably when the input audio signal primarily includes user speech (e.g., self-voice). However, the denoising system may struggle when the input audio signal includes loud competing speech (e.g., from other people talking in the vicinity of the user that may be as loud or even louder than the user speech) in addition to the user speech, as the denoising system may not be preconditioned on the user speech (e.g., the target speech). Thus, the denoising system may frequently pass through all received speech/voice (e.g., the speech/voice of the other people talking in the vicinity of the user along with the user speech) to the output audio signal. This can be especially problematic in the context of two way communication, where the wearable device should preferably capture audio that includes user speech and output an audio signal that includes the user speech and excludes background noise (e.g., background noise that includes speech from other people talking in the vicinity of the user) to one or more other devices. In addition, some denoising systems may struggle when the device is in noisier environments (e.g., when a signal-to-noise ratio (SNR) of the received audio signals is relatively low, for example, between −10 dB and IdB, such as −6 dB, −3 dB, IdB, etc.).

Often times, a device may include one or more sensors (e.g., inner sensors and/or outer sensors). The sensors may include one or more sensors outside of the device, as well as one or more sensors internal to the device. For example, a device may include an outer sensor located outside of the device and at a distance from a driver (e.g., electroacoustic transducer) of the device and an internal sensor located close to the driver of the feedback device. The internal sensor may be less sensitive to surrounding background noise (e.g., other people talking in the vicinity of the user) than the outer sensor as a result of the passive isolation and/or active noise cancellation of the internal sensor. As a result, an audio signal received at the internal sensor may have a higher SNR than an audio signal received at an outer sensor.

The present disclosure may enable a wearable device to provide an optimal denoised output audio signal using enhanced noise suppression. As a result of using the enhanced noise suppression described herein, any competing speech (e.g., the speech of the other people talking in the vicinity of the user) present in the input audio signals of the wearable device may be suppressed, and the output audio signal and any included user speech (which may be transmitted to a far end listener) may be cleaner (e.g., less noisy). In addition, the enhanced noise suppression described herein may also enable a wearable device to provide an optimal denoised output audio signal even when one or more of the input audio signals have low SNRs (e.g., SNRs less than 0 dB).

An Example System

FIG. 1 illustrates an example system 100, in which aspects of the present disclosure may be implemented. As shown, system 100 includes one or more sound processing and playback devices 110 (e.g., a wireless audio device, such as a wearable device as shown in FIG. 1) communicatively coupled with a source device 120 (e.g., a computing device or user device, such as a smartphone, tablet, computer, television, or the like). Throughout the present disclosure, the sound processing and playback device 110 may be referred to simply as the wearable device 110. The wearable device 110 may be configured to be worn by a user and may be a headset that includes two or more speakers and two or more sensors, as illustrated in FIG. 1. The source device 120 is illustrated as a smartphone or a tablet computer wirelessly paired with the wearable device 110. At a high level, the wearable device 110 may play audio content transmitted from the source device 120. The user may use the graphical user interface (GUI) on the source device 120 to select the audio content and/or adjust settings of the wearable device 110. The wearable device 110 provides soundproofing, active noise cancellation, and/or other audio enhancement features to play the audio content transmitted from the source device 120.

In certain aspects, the wearable device 110 includes voice activity detection (VAD) circuitry capable of detecting the presence of speech signals (e.g., human speech signals) in a sound signal received by sensors (not illustrated) of the wearable device 110. For instance, the sensors of the wearable device 110 may be implemented as microphones and may receive ambient and external sounds in the vicinity of the wearable device 110, including speech uttered by the user. The sound signal received by the sensors may have the speech signal mixed in with other sounds in the vicinity of the wearable device 110. Using the VAD, the wearable device 110 may detect and extract the speech signal from the received sound signal. In certain aspects, the VAD circuitry may be used to detect and extract speech uttered by the user in order to facilitate a voice call, voice chat between the user and another person, or voice commands for a virtual personal assistant (VPA), such as a cloud based VPA. In some cases, detections or triggers can include self-VAD (only starting up when the user is speaking, regardless of whether others in the area are speaking), active transport (sounds captured from transportation systems), head gestures, buttons, computing device based triggers (e.g., pause/un-pause from the phone), changes with input audio level, and/or audible changes in environment, among others. The voice activity detection circuitry may run or assist running the phase reconstruction disclosed herein.

In certain aspects, the wearable device 110 includes speaker identification circuitry capable of detecting an identity of a speaker to which a detected speech signal relates to. For example, the speaker identification circuitry may analyze one or more characteristics of a speech signal detected by the VAD circuitry and determine that the user of the wearable device 110 is the speaker. In certain aspects, the speaker identification circuitry may use any of the existing speaker recognition methods and related systems to perform the speaker recognition.

The wearable device 110 further includes hardware and circuitry including processor(s)/processing system and memory configured to implement one or more sound management capabilities or other capabilities including, but not limited to, noise canceling circuitry (not shown) and/or noise masking circuitry (not shown), body movement detecting devices/sensors and circuitry (e.g., one or more accelerometers, one or more gyroscopes, one or more magnetometers, etc.), geolocation circuitry and other sound processing circuitry. The noise cancelling circuitry is configured to reduce unwanted ambient sounds external to the wearable device 110 by using active noise cancelling (also known as active noise reduction). The sound masking circuitry is configured to reduce distractions by playing masking sounds via the speakers of the wearable device 110. The movement detecting circuitry is configured to use devices/sensors such as an accelerometer, gyroscope, magnetometer, or the like to detect whether the user wearing the wearable device 110 is moving (e.g., walking, running, in a moving mode of transport, etc.) or is at rest and/or the direction the user is looking or facing. The movement detecting circuitry may also be configured to detect a head position of the user for use in determining an event, as will be described herein, as well as in augmented reality (AR) applications where an AR sound is played back based on a direction of gaze of the user.

In certain aspects, the wearable device 110 is wirelessly connected to the source device 120 using one or more wireless communication methods including, but not limited to, Bluetooth, Wi-Fi, Bluetooth Low Energy (BLE), other radio frequency (RF) based techniques, or the like. In certain aspects, the wearable device 110 includes a transceiver that transmits and receives data via one or more antennae in order to exchange audio data and other information with the source device 120.

In certain aspects, the wearable device 110 includes communication circuitry capable of transmitting and receiving audio data and other information from the source device 120. The wearable device 110 also includes an incoming audio buffer, such as a render buffer, that buffers at least a portion of an incoming audio signal (e.g., audio packets) in order to allow time for retransmissions of any missed or dropped data packets from the source device 120. For example, when the wearable device 110 receives Bluetooth transmissions from the source device 120, the communication circuitry typically buffers at least a portion of the incoming audio data in the render buffer before the audio is actually rendered and output as audio to at least one of the transducers (e.g., audio speakers) of the wearable device 110. This is done to ensure that even if there are RF collisions that cause audio packets to be lost during transmission, there is time for the lost audio packets to be retransmitted by the source device 120 before the lost audio packets have been rendered by the wearable device 110 for output by one or more acoustic transducers of the wearable device 110.

The wearable device 110 is illustrated as over-the-head headphones; however, the techniques described herein apply to other wearable devices, such as wearable audio devices, including any audio output device that fits around, on, in, or near an ear (including open-car audio devices worn on the head or shoulders of a user) or other body parts of a user, such as head or neck. The wearable device 110 may take any form, wearable or otherwise, including standalone devices (including automobile speaker system), stationary devices (including portable devices, such as battery powered portable speakers), headphones (including over-ear headphones, on-car headphones, in-ear headphones), earphones, earpieces, headsets (including virtual reality (VR) headsets and AR headsets), goggles, headbands, earbuds, armbands, sport headphones, neckbands, or eyeglasses. In certain aspects, the wearable device 110 may be implemented as a banded headset with two cups each configured to deliver audio output.

In certain aspects, the wearable device 110 is connected to the source device 120 using a wired connection, with or without a corresponding wireless connection. The source device 120 may be a smartphone, a tablet computer, a laptop computer, a digital camera, or other computing device that connects with the wearable device 110. As shown, the source device 120 can be connected to a network 130 (e.g., the Internet) and may access one or more services over the network. As shown, these services can include one or more cloud 140 services.

In certain aspects, the source device 120 can access a cloud server in the cloud 140 over the network 130 using a mobile web browser or a local software application or "app" executed on the source device 120. In certain aspects, the software application or "app" is a local application that is installed and runs locally on the source device 120. In certain aspects, a cloud server accessible on the cloud 140 includes one or more cloud applications that are run on the cloud server. The cloud application may be accessed and run by the source device 120. For example, the cloud application can generate web pages that are rendered by the mobile web browser on the source device 120. In certain aspects, a mobile software application installed on the source device 120 or a cloud application installed on a cloud server, individually or in combination, may be used to implement the techniques for low latency Bluetooth communication between the source device 120 and the wearable device 110 in accordance with aspects of the present disclosure. In certain aspects, examples of the local software application and the cloud application include a gaming application, an audio AR or VR application, and/or a gaming application with audio AR or VR capabilities. The source device 120 may receive signals (e.g., data and controls) from the wearable device 110 and send signals to the wearable device 110.

An Example Wearable Device

Figure 2:
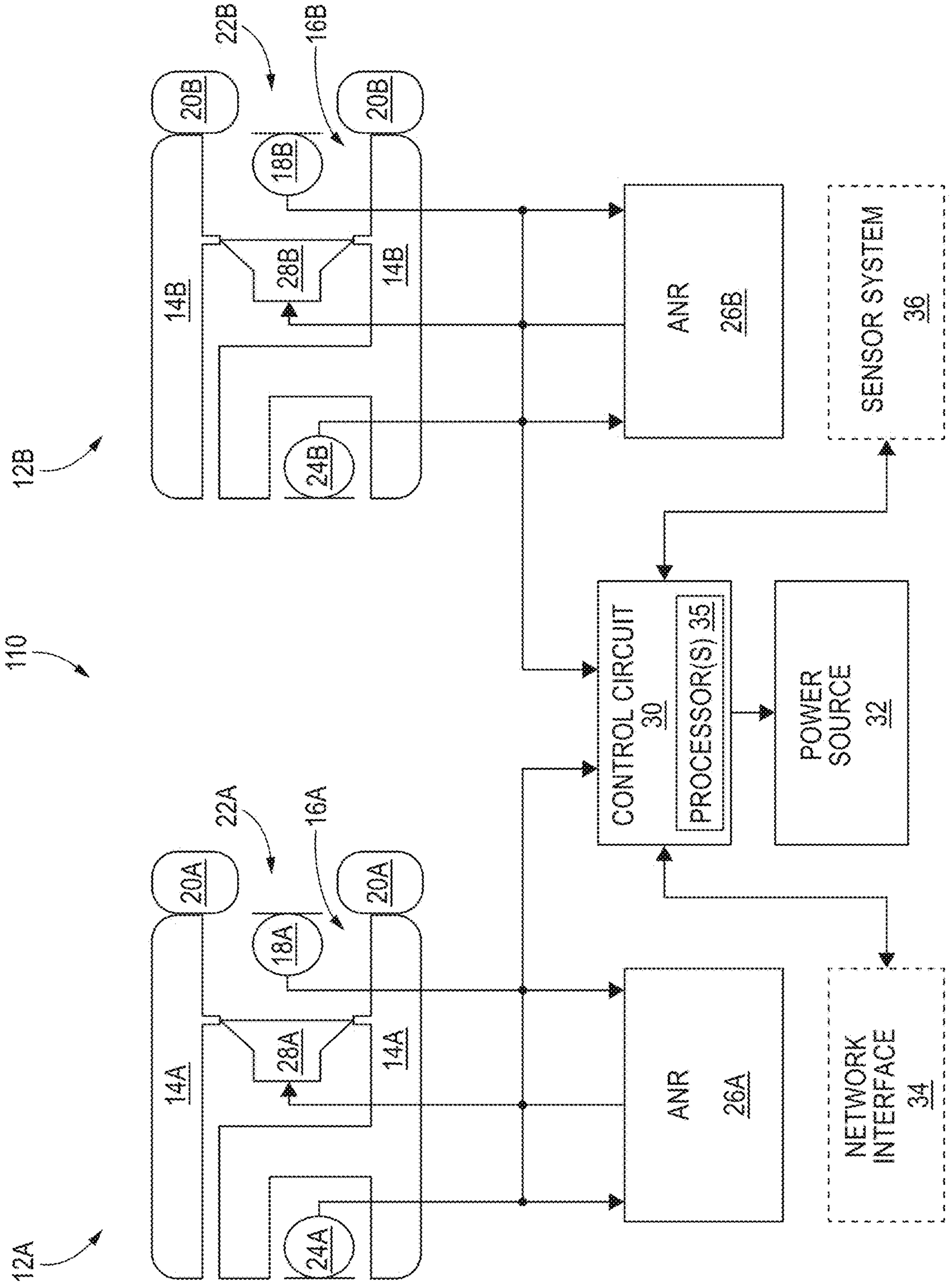
FIG. 2 illustrates an exemplary wireless audio device, in which aspects of the present disclosure may be implemented.

FIG. 2 illustrates an exemplary wearable device 110 and some of its components, in which aspects of the present disclosure may be implemented. Other components may be inherent in the wearable device 110 and not shown in FIG. 2. As shown, the wearable device 110 includes two earpieces 12A and 12B, each configured to direct sound towards an car of the user. Reference numbers appended with an "A" or a "B" indicate a correspondence of the identified feature with a particular one of the earpieces 12 (e.g., a left earpiece 12A and a right earpiece 12B). Each earpiece 12 includes a casing 14 that defines a cavity 16. In some examples, one or more internal sensors (e.g., inner microphone(s)) 18 may be disposed within cavity 16. In implementations where the wearable device 110 is car-mountable, an car coupling 20 (e.g., an car tip or car cushion) may be attached to the casing 14 and surround an opening to the cavity 16. A passage 22 is formed through the car coupling 20 and communicates with the opening to the cavity 16. In some examples, one or more outer sensors 24 are disposed on the casing in a manner that permits acoustic coupling to the environment external to the casing. The inner sensor(s) 18 and the outer sensor(s) 24 may each be implemented and/or referred to as a microphone, an accelerometer, and/or an inertial measurement unit (IMU).

In implementations that include active noise reduction (ANR) (which may include active noise cancellation (ANC) or controllable noise canceling (CNC)), the inner sensor(s) 18 may be an internal microphone(s) or feedback microphone(s) and the outer sensor(s) 24 may be feedforward microphone(s). In such implementations, each earpiece 12 includes an ANR circuit 26 that is in communication with the inner and outer sensors 18 and 24. The ANR circuit 26 receives an inner signal generated by the inner sensor(s) 18 and an outer signal generated by the outer sensor(s) 24 and performs an ANR process for the corresponding earpiece 12. The process includes providing a signal to an electroacoustic transducer 28 (e.g., speaker) disposed in the cavity 16 to generate an anti-noise acoustic signal that reduces or substantially prevents sound from one or more acoustic noise sources that are external to the earpiece 12 from being heard by the user. In addition to providing an anti-noise acoustic signal, the electroacoustic transducer 28 may utilize its sound-radiating surface for providing an audio output for playback (e.g., for a continuous audio feed).

In certain aspects, the wearable device 110 may also include a control circuit 30. The control circuit 30 is in communication with the inner sensor(s) 18, outer sensor(s) 24, and electroacoustic transducers 28, and receives the inner and/or outer microphone signals. In some cases, the control circuit 30 includes one or more microcontroller(s) or processor(s) 35, including for example, a digital signal processor (DSP) and/or an advanced reduced instruction set computer (RISC) machine (ARM) chip. In some cases, the microcontroller(s)/processor(s) (or simply, processor(s)) 35 may include multiple chipsets for performing distinct functions. For example, the processor(s) 35 may include a DSP chip for performing music and voice related functions, and a co-processor such as an ARM chip (or chipset) for performing sensor related functions.

The control circuit 30 may also include analog to digital converters for converting the inner signals from the two inner sensors 18 and/or the outer signals from the two outer sensors 24 to digital format. In response to the received inner and/or outer microphone signals, the control circuit 30 (including processor(s) 35) may take various actions. For example, audio playback may be initiated, paused, or resumed, a notification to a user (e.g., wearer) may be provided or altered, and a device (e.g., a cellular phone, a handheld device, a wireless device, a laptop computer, a tablet, a smartphone, an Internet of things (IOT) device, a wearable device, an AR device, a VR device, etc.) in communication with the wearable device 110 may be controlled. The wearable device 110 may also include a power source 32. The control circuit 30 and power source 32 may be in one or both of the earpieces 12 or may be in a separate housing in communication with the earpieces 12. The wearable device 110 may also include a network interface 34 to provide communication between the wearable device 110 and one or more audio sources or other personal audio devices (e.g., source device 120 as illustrated in FIG. 1). The network interface 34 may be wired (e.g., Ethernet) or wireless (e.g., employ a wireless communication protocol such as IEEE 802.11, Bluetooth, Bluetooth Low Energy (BLE), or other local area network (LAN) or personal area network (PAN) protocols).

The network interface 34 is shown in phantom, as portions of the network interface 34 may be located remotely from the wearable device 110. The network interface 34 may provide for communication between the wearable device 110, audio sources, and/or other networked (e.g., wireless) speaker packages and/or other audio playback devices via one or more communications protocols. The network interface 34 may provide either or both of a wireless interface and a wired interface. The wireless interface may allow the wearable device 110 to communicate wirelessly with other devices in accordance with any communication protocol noted herein. In some particular cases, a wired interface may be used to provide network interface functions via a wired (e.g., Ethernet) connection.

In certain aspects, the network interface 34 may also include one or more network media processor(s) for supporting, e.g., Apple AirPlay® (a proprietary protocol stack/suite developed by Apple Inc., with headquarters in Cupertino, Calif., that allows wireless streaming of audio, video, and photos, together with related metadata between devices) or other known wireless streaming services (e.g., an Internet music service such as: Pandora®, a radio station provided by Pandora Media, Inc. of Oakland, Calif., USA; Spotify®, provided by Spotify USA, Inc., of New York, N.Y., USA); or vTuner®, provided by vTuner.com of New York, N.Y., USA); and network-attached storage (NAS) devices). For example, when a user connects an AirPlay® enabled device, such as an iPhone or iPad device, to the network, the user may then stream music to the network connected audio playback devices via Apple AirPlay®. Notably, the audio playback device can support audio-streaming via AirPlay® and/or DLNA's UPnP protocols, and all integrated within one device. Other digital audio coming from network packets may come straight from the network media processor(s) through (e.g., through a USB bridge) to the control circuit 30. As noted herein, in some cases, the control circuit 30 may include one or more processor(s) and/or microcontroller(s) (simply, "processor(s)" 35), which can include decoders, digital signal processors (DSPs) hardware/software, ARM processor(s) hardware/software, etc. for playing back (rendering) audio content at electroacoustic transducers 28. In some cases, the network interface 34 may also include Bluetooth circuitry for Bluetooth applications (e.g., for wireless communication with a Bluetooth enabled audio source such as a smartphone or tablet). In operation, streamed data can pass from the network interface 34 to the control circuit 30, including the processor(s) or microcontroller(s) (e.g., processor(s) 35). The control circuit 30 may execute instructions (e.g., for performing, among other things, digital signal processing, decoding, and equalization functions), including instructions stored in a corresponding memory (which may be internal to control circuit 30 or accessible via network interface 34 or other network connection (e.g., cloud-based connection). The control circuit 30 may be implemented as a chipset of chips that include separate and multiple analog and digital processors. The control circuit 30 may provide, for example, for coordination of other components of the wearable device 110, such as control of user interfaces (not shown) and applications run by the wearable device 110.

In addition to a processor(s) and/or microcontroller(s), control circuit 30 may also include one or more digital-to-analog (D/A) converters for converting the digital audio signal to an analog audio signal. This audio hardware may also include one or more amplifiers which provide amplified analog audio signals to the electroacoustic transducer(s) 28, which each include a sound-radiating surface for providing an audio output for playback. In addition, the audio hardware may include circuitry for processing analog input signals to provide digital audio signals for sharing with other devices.

The memory in control circuit 30 may include, for example, flash memory and/or non-volatile random access memory (NVRAM). In some implementations, instructions (e.g., software) are stored in an information carrier. The instructions, when executed by one or more processing devices (e.g., the processor(s) or microcontroller(s) in control circuit 30), perform one or more processes, such as those described elsewhere herein. The instructions can also be stored by one or more storage devices, such as one or more (e.g., non-transitory) computer or machine-readable mediums (for example, the memory, or memory on the processor(s)/microcontroller(s)). As described herein, the control circuit 30 (e.g., memory, or memory on the processor(s)/microcontroller(s)) may include a control system including instructions for controlling directional audio selection functions according to various particular implementations. It is understood that portions of the control circuit 30 (e.g., instructions) could also be stored in a remote location or in a distributed location and could be fetched or otherwise obtained by the control circuit 30 (e.g., via any communications protocol described herein) for execution. The instructions may include instructions for controlling device functions based upon detected don/doff events (i.e., the software modules include logic for processing inputs from a sensor system to manage audio functions), as well as digital signal processing and equalization.

The wearable device 110 may also include a sensor system 36 coupled with control circuit 30 for detecting one or more conditions of the environment proximate wearable device 10. The sensor system 36 may include inner sensor(s) 18 and/or outer sensors 24, sensors for detecting inertial conditions at the personal audio device, and/or sensors for detecting conditions of the environment proximate the wearable device 110, as described herein. Sensor system 36 may also include one or more proximity sensors, such as a capacitive proximity sensor or an IR sensor, and/or one or more optical sensors.

The sensors may be on-board the wearable device 110 or may be remote or otherwise wirelessly (or hard-wired) connected to the wearable device 110. As described further herein, sensor system 36 may include a plurality of distinct sensor types for detecting proximity information, inertial information, environmental information, or commands at the wearable device 10. In particular implementations, sensor system 36 may enable detection of user movement, including movement of a user's head or other body part(s). Portions of sensor system 36 may incorporate one or more movement sensors, such as accelerometers, gyroscopes and/or magnetometers and/or a single IMU having three-dimensional (3D) accelerometers, gyroscopes and a magnetometer.

In various implementations, the sensor system 36 can be located at the wearable device 110 (e.g., where a proximity sensor is physically housed in the wearable device 110). In some examples, the sensor system 36 is configured to detect a change in the position of the wearable device 110 relative to the user's head (e.g., detect the device operating state). Data indicating the change in the position of the wearable device 110 may be used to trigger a command function, such as activating an operating mode of the wearable device 110, modifying playback of audio at the wearable device 110 (e.g., by modifying the audio, noise cancellation (e.g., ANC), or transparency of the wearable device), or controlling a power function of the personal audio device 10.

The sensor system 36 may also include one or more interface(s) for receiving commands at the wearable device 110. For example, sensor system 36 may include an interface permitting a user to initiate functions of the wearable device 110. In a particular example implementation, the sensor system 36 may include, or be coupled with, a capacitive touch interface for receiving tactile commands on the wearable device 110.

In other implementations, as illustrated in the phantom depiction in FIG. 2, one or more portions of the sensor system 36 may be located at another device capable of indicating movement and/or inertial information about the user of the wearable device 110. For example, in some cases, the sensor system 36 may include an IMU physically housed in a hand-held device such as a smart device (e.g., smart phone, tablet, etc.) a pointer, or in another wearable audio device. In particular example implementations, at least one of the sensors in the sensor system 36 may be housed in a wearable audio device distinct from the wearable device 110, such as where wearable device 110 includes headphones and an IMU is located in a pair of glasses, a watch, or other wearable electronic device.

In certain aspects, the control circuit 30 is in communication with the inner sensor(s) 18 and receives the two inner signals. Alternatively, the control circuit 30 may be in communication with the outer sensors 24 and receive the two outer signals. In another alternative, the control circuit 30 may be in communication with both the inner sensor(s) 18 and outer sensors 24 and receives the two inner and two outer signals. It should be noted that in some implementations, there may be multiple inner and/or outer microphones in each earpiece 12. As noted herein, the control circuit 30 may include one or more microcontroller(s) or processor(s) having a DSP and the inner signals from the two inner sensor(s) 18 and/or the outer signals from the two outer sensors 24 are converted to digital format by analog to digital converters. In response to the received inner and/or outer signals, the control circuit 30 may take various actions. For example, the power supplied to the wearable device 110 may be reduced upon a determination that one or both earpieces 12 are off-head. In another example, full power may be returned to the wearable device 110 in response to a determination that at least one earpiece becomes on head. Other aspects of the wearable device 110 may be modified or controlled in response to determining that a change in the operating state of the earpiece 12 has occurred. For example, ANR functionality may be enabled or disabled, audio playback may be initiated, paused or resumed, a notification to a wearer may be altered, and a device (e.g., a cellular phone, a handheld device, a wireless device, a laptop computer, a tablet, a smartphone, an Internet of things (IOT) device, a wearable device, an AR device, a VR device, etc.) in communication with the wearable device 110 may be controlled. As illustrated, the control circuit 30 generates a signal that is used to control a power source 32 for the wearable device 110. The control circuit 30 and power source 32 may be in one or both of the earpieces 12 or may be in a separate housing in communication with the earpieces 12.

Example Operations for Enhanced Noise Suppression During Audio Signal Processing Certain aspects of the present disclosure provide techniques, including devices and systems implementing the techniques, for using enhanced noise suppression to provide optimal denoised output. Enhanced noise suppression as described herein may involve determining an optimal denoised output audio signal using an input audio signal received at a first sensor (e.g., a sensor located outside of the device) and a second audio input received at a second sensor (e.g., an internal sensor). As a result of using the enhanced noise suppression described herein, any competing speech (e.g., the speech of the other people talking in the vicinity of the user) present in the input audio signals may be suppressed, and the output audio signal and any included user speech (which may be transmitted to a far end listener) may be cleaner (e.g., less noisy). In certain aspects, the device may determine the output audio signal by using a trained machine-learning model configured to at least partially denoise the first audio signal and/or the second audio signal.

Figure 3:
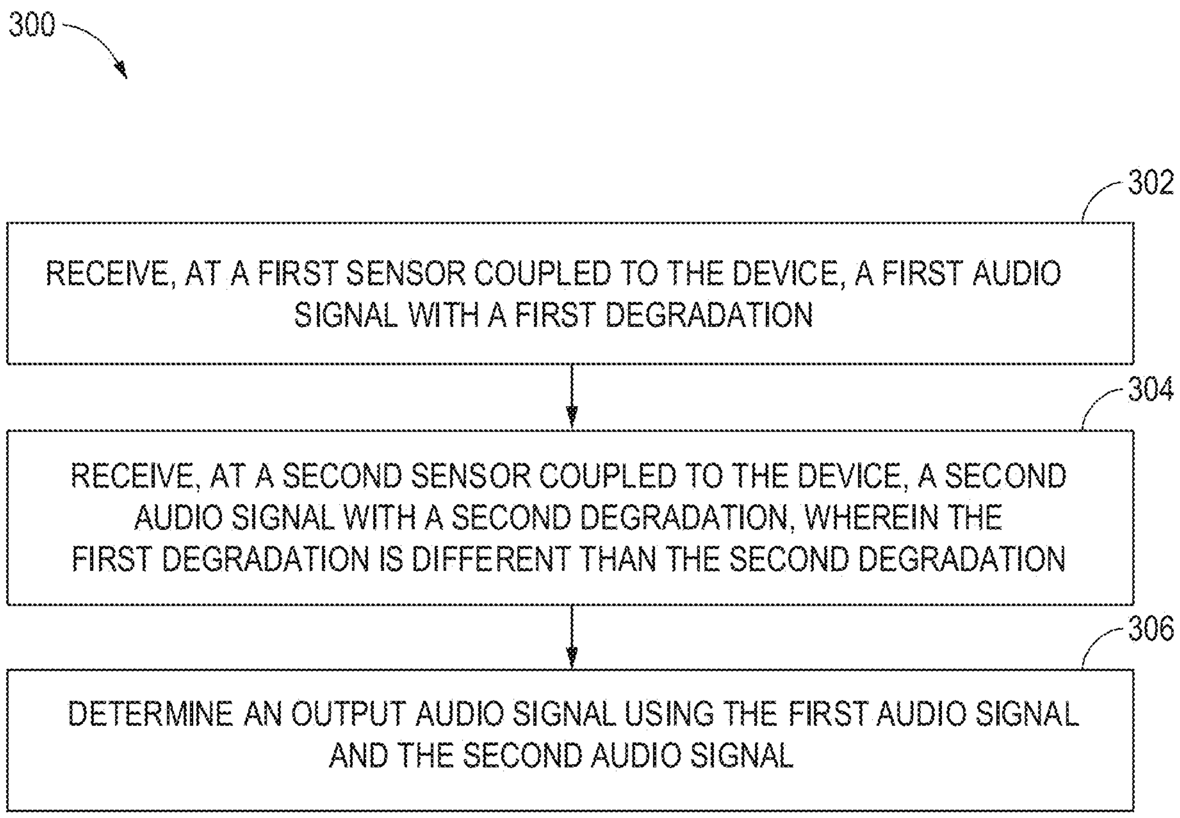
FIG. 3 illustrates example operations for audio signal processing performed by a device, according to certain aspects of the present disclosure.
Figure 4:
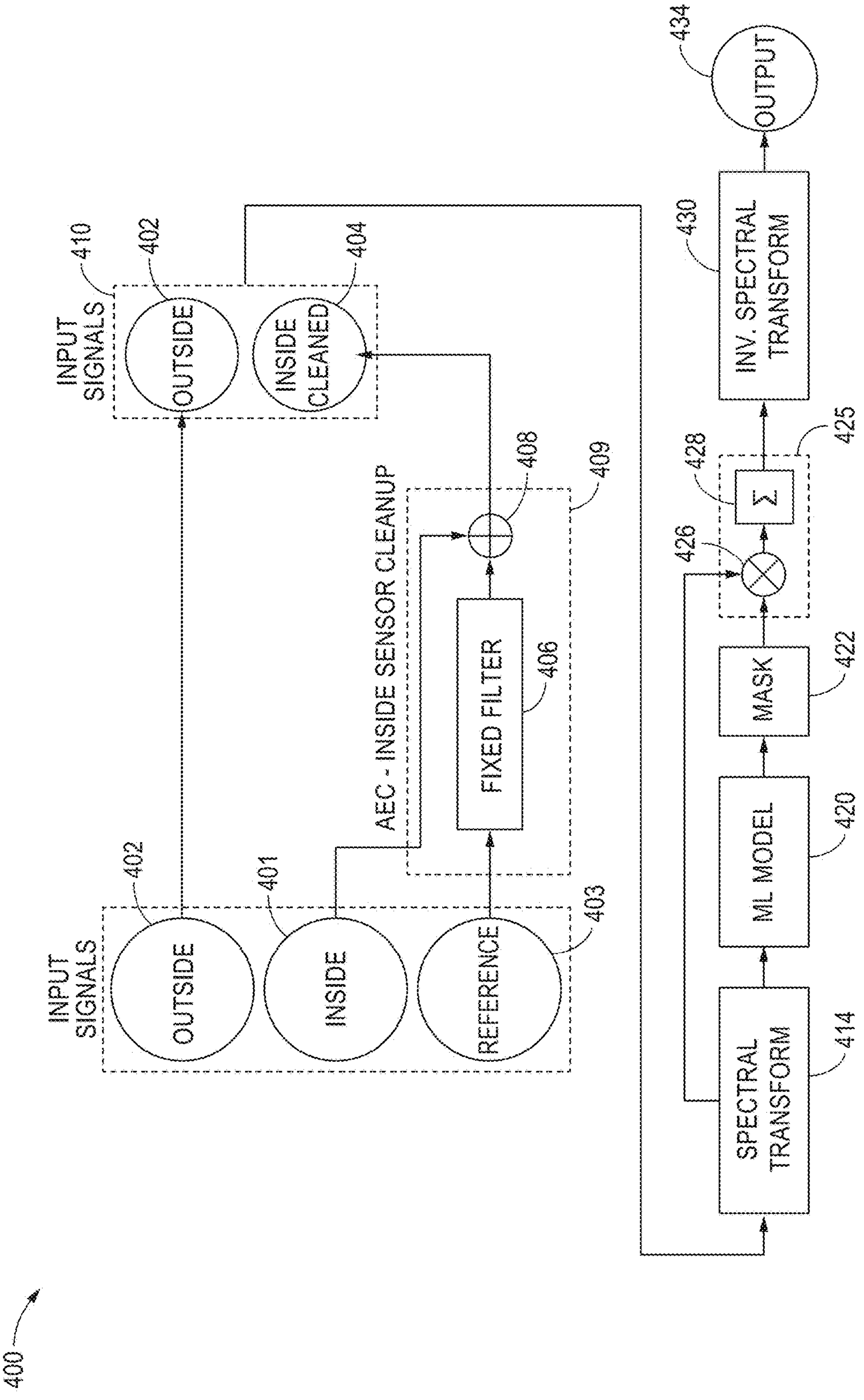
FIG. 4 is a block diagram of an example process flow for enhanced noise suppression during the operations of FIG. 3 for audio signal processing, according to certain aspects of the present disclosure.

FIG. 3 illustrates example operations 300 for audio signal processing performed by a device (e.g., the wearable device 110 of FIGS. 1 and 2), according to certain aspects of the present disclosure. FIG. 4 is a block diagram of an example process flow 400 for enhanced noise suppression during the operations 300 of FIG. 3 for audio signal processing, according to certain aspects of the present disclosure. FIGS. 5A-G are block diagrams of example process flows for enhanced noise suppression during the operations of FIG. 3 for audio signal processing, according to certain aspects of the present disclosure. Therefore, FIG. 3, FIG. 4, and FIGS. 5A-G are herein described together for clarity. The operations 300 and the process flows 400, 500A, 500B, 500C, 500D, 500E, 500F, and 500G may be performed by a wearable device (e.g., the device 110 of FIG. 1 and FIG. 2), or by a control circuit (e.g., control circuit 30) of the device (e.g., using one or more processors, individually or collectively, included in the control circuit 30). The operations 300 and the process flows 400, 500A, 500B, 500C, 500D, 500E, 500F, and 500G may be utilized by the device continuously, periodically, or selectively.

The operations 300 may include, at block 302, receiving, at a first sensor (e.g., outer sensor(s) 24) coupled to the device, a first audio signal 402 (e.g., labeled "OUTSIDE" in FIG. 4) with a first degradation. In certain aspects, the first sensor may include or be implemented by an outer sensor located outside the device (e.g., an external microphone). In certain aspects, the first sensor may be implemented by multiple outer sensors coupled to the device. In these aspects, the first audio signal 402 may be received at the multiple outer sensors. The multiple outer sensors may include a microphone array that includes a pre-processing step in order to boost the SNR of the first audio signal 402 received at the multiple outer sensors. The microphone array pre-processing may, for example, be fixed, adaptive, or machine learning powered.

At block 304, the operations 300 may include receiving, at a second sensor (e.g., inner sensor(s) 18) coupled to the device, a second audio signal 401 (e.g., labeled "INSIDE" in FIG. 4) with a second degradation. The first audio signal 402 and the second audio signal 401 may each include a speech component originating from the user of the device. In some cases, the second audio signal 401 may be clean (e.g., noiseless), or at least cleaner (e.g., less noisy) than the first audio signal 402 (e.g., as a result of the passive isolation and/or active noise cancellation of the second sensor). The differences between the noise of the first audio signal 402 and the second audio signal 401 may be due to the location of the first sensor and the second sensor. For example, the second sensor may be an inner sensor, and therefore may receive a signal with less noise than the first sensor due to the passive insulation and/or active noise cancellation of the second sensor. That is, the first noise may be greater than the second noise. In certain aspects, the second sensor may include or be implemented by, for example, a bone conduction sensor and/or transducer (e.g., an internal microphone inside an ear canal of a user of the device, an internal microphone facing the car canal on an around car device, a voice band accelerometer outside the car canal, a feedback microphone, an inertial measurement unit (IMU), or the like). In some cases, blocks 302 and 304 may occur simultaneously. In other cases, block 302 may occur before or after block 304.

The first degradation (e.g., degradation associated with the first audio signal 402) may be different than the second degradation (e.g., degradation associated with the second audio signal 401). The differences between the degradation of the first audio signal 402 and the second audio signal 401 may be due at least in part to the location of the first sensor and the second sensor. For example, the second sensor may be an inner sensor, and therefore may receive a differently degraded signal than the first sensor due to the passive insulation, active noise cancellation, and/or other attributes of the second sensor (compared to the first sensor). The first audio signal 402 may be degraded primarily by additive noise and the second audio signal 401 may be degraded primarily by bandwidth limiting and time-varying filtering. As a result, the second audio signal 401 may be more bandwidth limited than the first audio signal 402.

At block 306, the operations 300 may include determining an output audio signal 434 (labeled "OUTPUT" in FIG. 4) using the first audio signal 402 and the second audio signal 401.

In certain aspects, the second audio signal 401 may include both a user speech component and a non-user speech component. The non-user speech component may include, for example, a far-end speaker and/or sound generated while the device is in an aware mode. The operations 300 may include preprocessing configured to clean-up the second audio signal 401. The preprocessing may occur after the second audio signal 401 is received at the second sensor. In certain aspects, the second audio signal 401 may be preprocessed using acoustic echo cancellation (AEC) 409 configured to effectively remove a non-user speech component of the second audio signal 401, as illustrated in FIG. 4. The AEC 409 may involve receiving the second audio signal 401 and a reference signal 403 (labeled "REFERENCE") (e.g., a digital reference of the non-user speech component), and effectively removing the reference signal 403 (along with the non-user speech component) from the second audio signal 401 to generate a cleaned second audio signal 404 (labeled "INSIDE CLEANED"). In some cases, the AEC 409 may involve, for example, applying a fixed filter 406 (labeled "FIXED FILTER"). Applying the fixed filter 406 may involve, for example, applying a fixed second order section (SOS) filter and performing processing on the reference signal 403. The AEC 409 may also include adding the processed reference signal 403 to the second audio signal 401 via an adder 408 to remove the reference signal 403 and the non-user speech component from the second audio signal 401. The AEC 409 may involve an adaptive filter or a machine learning model.

Although the first audio signal 402 and the cleaned second audio signal 404 may undergo processing according to the process flow 400, the first audio signal 402 and the cleaned second audio signal 404 may continue to be referred to as the first audio signal 402 and the cleaned second audio signal 404 respectively in their various processed states during the various processing blocks (e.g., blocks, 414, 420, 422, 426, 428). The processing blocks may be performed in the order described herein and illustrated in FIG. 4, or in any other order. In certain aspects, additional processing blocks not illustrated herein may also be include in the process flow 400 to enable the enhanced noise suppression.

After the preprocessing of the cleaned second audio signal 404, the first audio signal 402 and the second audio signal 404 (collectively labeled "INPUT SIGNALS" 410) may be separately processed at block 414 (labeled "SPECTRAL TRANSFORM"). The processing at block 414 may include using a spectral transform for the first audio signal 402 and the cleaned second audio signal 404. In some cases, block 414 and/or block 420 (labeled "ML MODEL") described below may include one or more of rescaling to normalize the first audio signal 402 and the cleaned second audio signal 404, separately converting the first audio signal 402 and the cleaned second audio signal 404 to the frequency domain using a Short-Time Fourier Transform (STFT), separately determining the magnitude of each of the first audio signal 402 and the cleaned second audio signal 404, and passing the magnitude of the first audio signal 402 and the cleaned second audio signal 404 through a Mel filter bank to generate a real Mel scaled magnitude spectrogram for each of the first audio signal 402 and the cleaned second audio signal 404. In certain aspects, the Mel scaled magnitude spectrogram for each of the first audio signal 402 and the cleaned second audio signal 404 may also be compressed (e.g., power law compressed).

In certain aspects, determining the output audio signal 434 includes using a trained machine-learning model. In some cases, the trained machine-learning model may be implemented by a deep learning model. The trained machine-learning model may use various machine learning techniques based on artificial neural networks. For example, the trained machine-learning model, when implemented as a deep learning model, may include deep learning architectures, such as deep neural networks, deep belief networks, deep reinforcement learning, recurrent neural networks, convolutional neural networks, transformers, and the like.

The first audio signal 402 and the cleaned second audio signal 404 output from block 414 may be processed through the trained machine-learning model at block 420. The trained machine-learning model may be used to determine and output a spectral mask for the first audio signal 402 and/or a spectral mask for the cleaned second audio signal 404. The spectral masks may be referred to herein simply as mask(s). The mask for the first audio signal 402 may be configured to at least partially denoise and/or deverberate the first audio signal 402, and the mask for the cleaned second audio signal 404 may be configured to at least partially denoise and/or deverberate the cleaned second audio signal 404. The masks may refer to frequency-domain processing (e.g., time by frequency bins), and may be real or complex general filters. The mask(s) may be determined and output by the trained machine-learning model at block 422. In certain aspects, the trained machine-learning model at block 420 may be configured to receive any number of input signals and return any number of masks, each mask configured to denoise an input signal. For example, the process flow 400 may include both the first audio signal 402 and the second audio signal 401, but the trained machine-learning model at block 420 may determine a mask for the first audio signal 402 (which may be applied at block 428, as described below), and may not determine a mask for the second audio signal 401.

The mask(s) output from block 422 for the first audio signal 402 and/or the cleaned second audio signal 404 may each be pointwise multiplied by the respective magnitude of the first audio signal 402 and the cleaned second audio signal 404 (from block 414) at block 426 using a multiplier.

The resulting denoised first audio signal 402 and the cleaned second audio signal 404 may be summed together at block 428 (labeled "E"). Blocks 426 and 428 may be collectively referred to herein as block 425.

At block 430 (labeled "INV. SPECTRAL TRANSFORM"), an inverse spectral transform may be used for the summed first audio signal 402 and the cleaned second audio signal 404 output from block 428 to generate the output audio signal 434. In some cases, block 430 may include one or more of converting the summed first audio signal 402 and the cleaned second audio signal 404 back to the time domain using an inverse STFT and rescaling the summed first audio signal 402 and the cleaned second audio signal 404 using an inverse scalar. The output audio signal 434 output may be used, for example, during communication with another device.

Figure 5A:
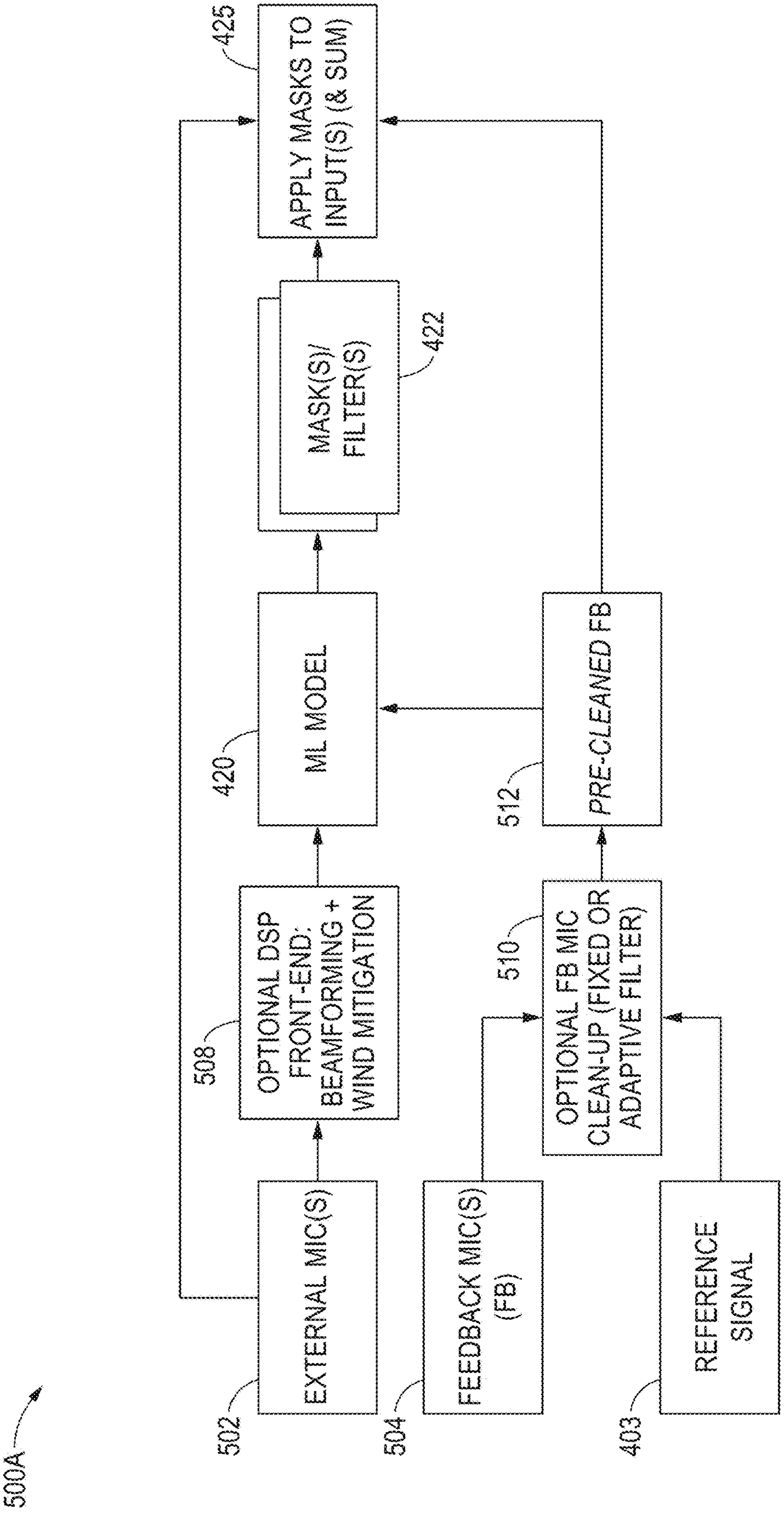
FIGS. 5A-G are block diagrams of example process flows for enhanced noise suppression during the operations of FIG. 3 for audio signal processing, according to certain aspects of the present disclosure.

In the example process flow 500A of FIG. 5A, input signal(s) (e.g., first audio signal 402) received by one or more external sensors (e.g., external microphones) at block 502 (labeled "EXTERNAL MIC(S)") may undergo preprocessing at block 508 (labeled "OPTIONAL DSP FRONT-END"). The preprocessing at block 508 may include, for example, optional DSP front-end beamforming and/or wind mitigation.

Another input signal (e.g., second audio signal 401) received by an internal sensor at block 504 (labeled "FEEDBACK MIC(S)") and a reference signal 403 (e.g., a reference signal of the non-user speech component of the input signal of the internal sensor) may undergo processing at block 510 (labeled "OPTIONAL FB MIC CLEAN-UP") to generate the cleaned input signal at block 512 (labeled "PRE-CLEANED FB"). The processing at block 510 may include, for example, the use of a fixed filter or an adaptive filter. The internal sensor at block 504 may be similar to the internal sensor described above, and may be implemented by, for example, a bone conduction sensor and/or transducer (e.g., an internal microphone inside an ear canal of a user of the device, an internal microphone facing the ear canal on an around ear device, a voice band accelerometer outside the ear canal, a feedback microphone, an IMU, or the like).

The cleaned input signal output from block 510 and the input signal output from block 508 may both be inputs to the trained machine-learning model at block 420. As described above, the trained machine-learning model may determine masks configured to denoise the cleaned input signal from block 512 (e.g., originating from the internal sensor(s)) and the input signal from block 508 (originating from the external sensor(s)). The mask(s) may be output by the trained machine-learning model at block 422. The mask(s) may be applied to their respective input signals (e.g., from block 502 and block 512) and the resulting denoised input signals may be summed together at block 425 to provide an output audio signal (e.g., output audio signal 434), which may be output to another device, also as described above. Although only a single external sensor and a single feedback sensor is illustrated in FIG. 5A, any number of signals received at any number of external sensor and internal sensors may be used.

Figure 5B:
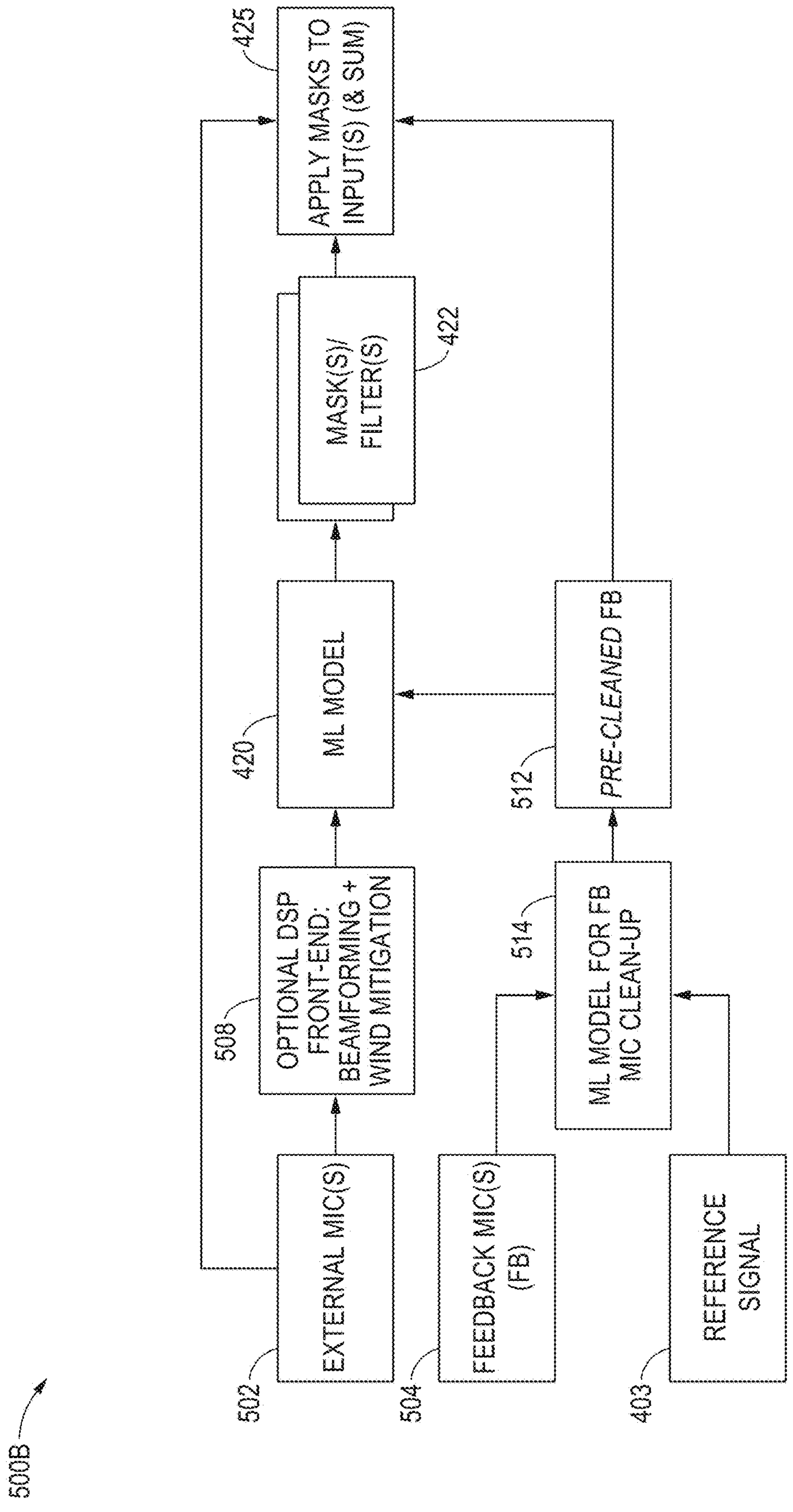

The example process flow 500B of FIG. 5B may be similar to the process flow 500A, but block 510 may be replaced by block 514 (labeled "ML MODEL FOR FB MIC CLEAN-UP"). At block 514, a trained machine-learning model may be configured to clean-up (e.g., preprocess) the input signal received at block 504 and the reference signal 403 to generate the cleaned input signal at block 512.

Figure 5C:
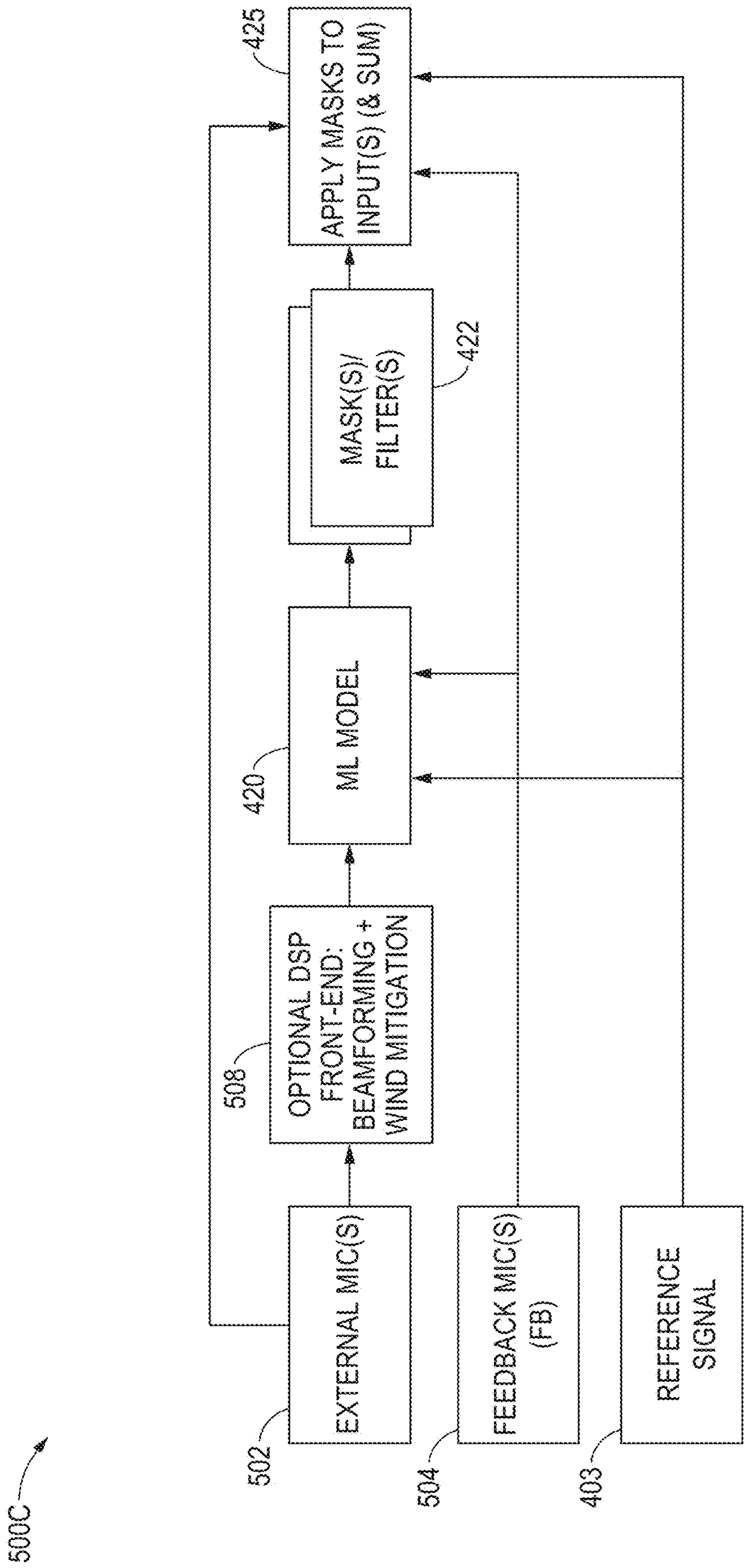

The example process flow 500C of FIG. 5C may be similar to the process flow 500A, but may not include block 510 or block 512. In the process flow 500C, the trained machine-learning model at block 420 may also be also be configured to receive the reference signal 403 and perform cleanup of the input signal from the feedback mic(s) at block 504 (e.g., effectively removing the reference signal 403 and any non-user speech component from the second audio signal 401), in addition to determining masks for the signal received at block 502 and the signal received at block 504.

Figure 5D:
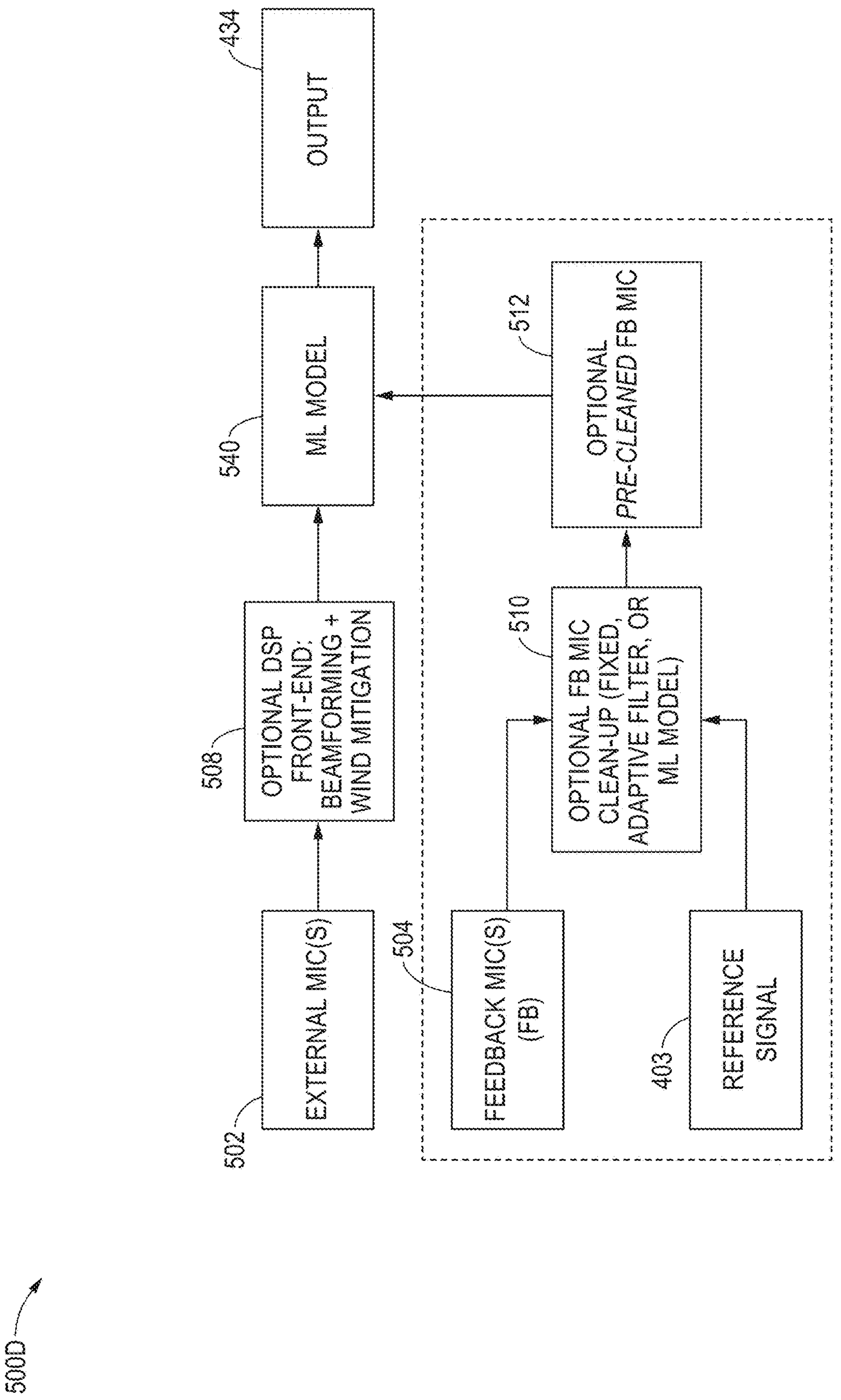

The example process flow 500D of FIG. 5D may be similar to the process flow 500A, but may not include blocks 422 and 425, and block 420 may be replaced by block 540 (labeled "ML MODEL"). In the process flow 500D and at block 540, a trained machine-learning model may be configured to operate on a signal in and signal out basis (as opposed to the signal in and mask/filter out operation of the trained machine-learning model at block 420). As a result, the process flow 500D may be capable of handling nonlinear distortions. In certain aspects, the trained machine-learning model may be configured to operate in the time domain or the time-frequency domain.

Figure 5E:
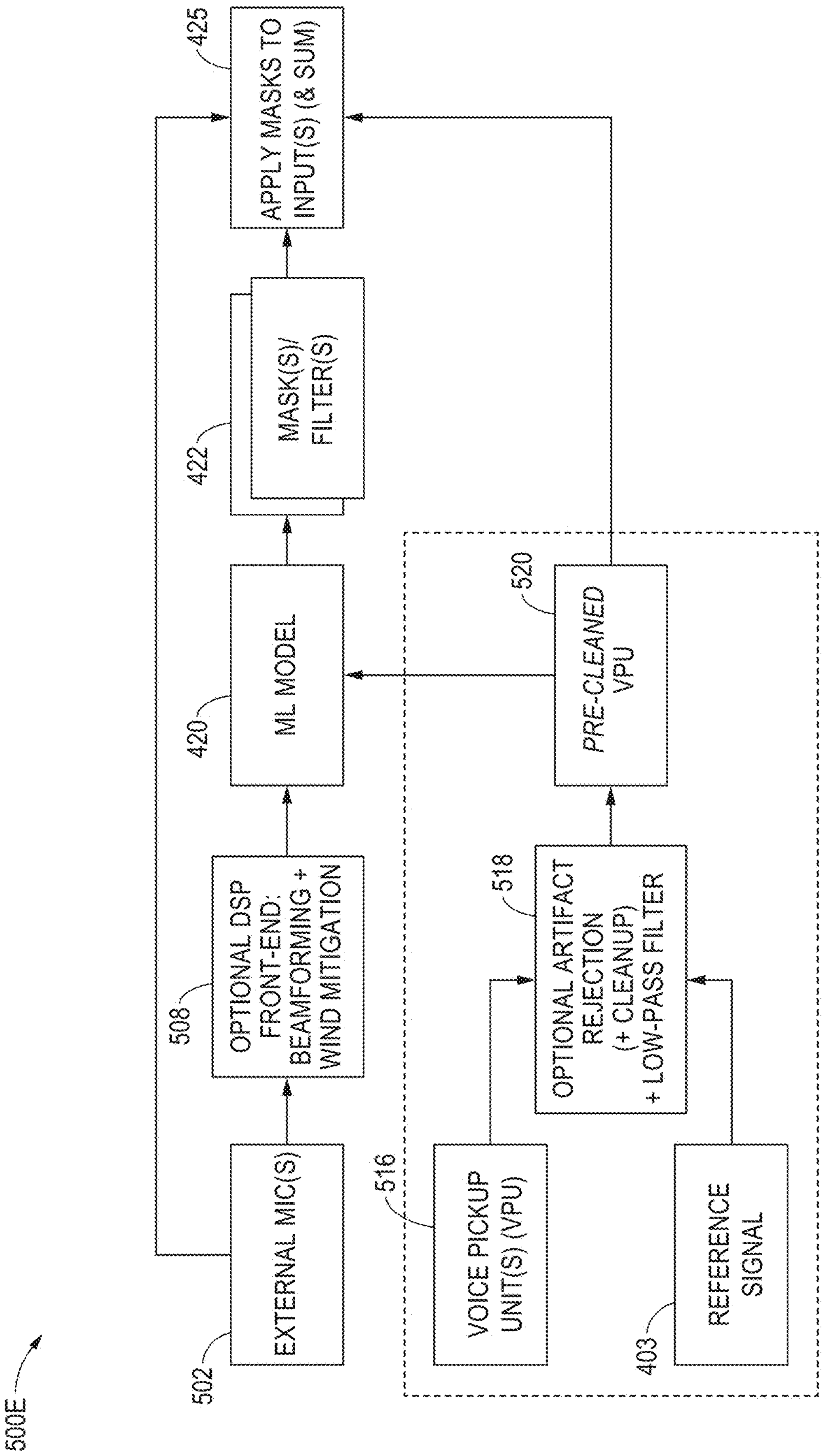

The example process flow 500E of FIG. 5E may be similar to the process flow 500A, but block 504 may be replaced by block 516 (labeled "VOICE PICKUP UNIT(S) (VPU)"), block 510 may be replaced by block 518 (labeled "OPTIONAL ARTIFACT REJECTION (+CLEAN UP)+ LOW-PASS FILTER"), and block 512 may be replaced by block 520 (labeled "PRE-CLEANED VPU"). That is, the feedback sensor(s) may be replaced by one or more VPU(s), and the input signal(s) received at block 516 may be processed at block 518. Block 518 may be configured to reject any artifacts present in the input signal(s) received at block 516, clean-up the signal(s), and/or apply a low-pass filter to the signals to generate the pre-cleaned VPU signal at block 520.

Figure 5F:
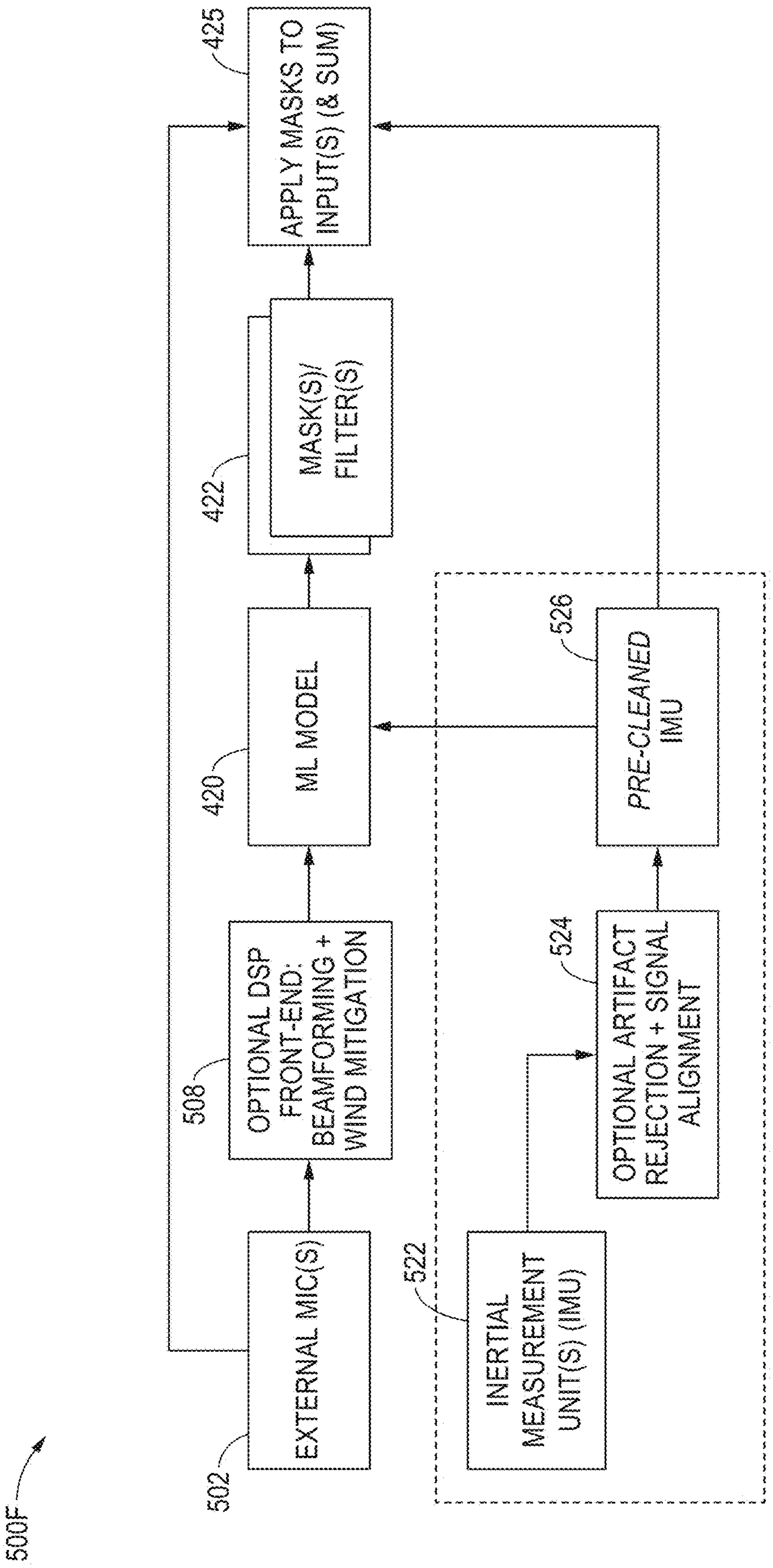

The example process flow 500F of FIG. 5F may be similar to the process flow 500A, but block 504 may be replaced by block 522 (labeled "INERTIAL MEASUREMENT UNIT (S) (IMU)"), block 510 may be replaced by block 524 (labeled "OPTIONAL ARTIFACT REJECTION+SIGNAL ALIGNMENT"), and block 512 may be replaced by block 526 (labeled "PRE-CLANED IMU"). That is, the feedback sensor(s) may be replaced by an IMU(s), and the input signal(s) received at block 522 may be processed at block 524. Block 524 may be configured to reject any artifacts present in the input signal(s) received at block 522 and/or perform signal alignment to generate the pre-cleaned IMU signal at block 526.

Figure 5G:
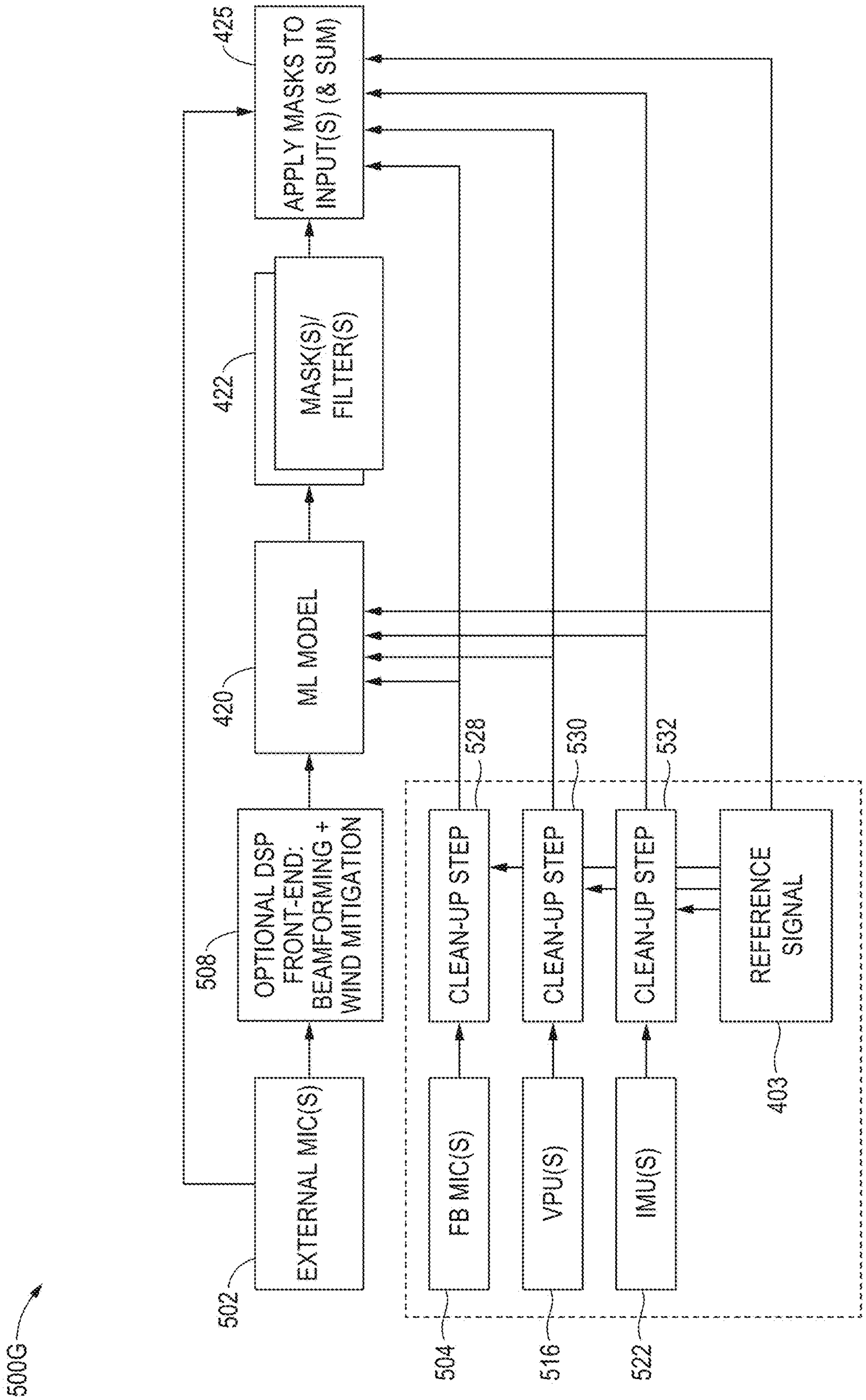

The example process flow 500G of FIG. 5G may be similar to the process flow 500A, but may include block 516, block 522, block 528 (labeled "CLEAN-UP STEP"), block 530 (labeled "CLEAN-UP STEP"), and block 532 (labeled "CLEAN-UP STEP"). That is, the process flow 500G may include input signals from the feedback sensor at block 504, the VPU(s) at block 516, and the IMU(s) at block 522. Each of the input signals at blocks 504, 516, and 522 may be input to blocks 522, 530, and 532 respectively (along with the reference signal 403) and undergo preprocessing (e.g., using a fixed filter or an adaptive filter). The preprocessed signals output from blocks 522, 530, and 532 may be input to the trained machine-learning model at block 420. The masks determined by the trained machine learning model at block 420 and output at block 422 may be applied to the respective input signals (e.g., from block 502, block 528, block 530, and block 532) and the resulting denoised input signals may be summed together at block 425 to provide an output audio signal (e.g., output audio signal 434), which may be output to another device, also as described above.

Although the process flows 400, 500A, 500B, 500C, 500D, 500E, 500F, and 500G are each described herein individually, it is to be understood that aspects of any of the process flows 400, 500A, 500B, 500C, 500D, 500E, 500F, and 500G may be combined and implemented together in a single process flow.

Additional Considerations

It is noted that, descriptions of aspects of the present disclosure are presented above for purposes of illustration, but aspects of the present disclosure are not intended to be limited to any of the disclosed aspects. Many modifications and variations will be apparent to those of ordinary skill in the art without departing from the scope and spirit of the described aspects.

In the preceding, reference is made to aspects presented in this disclosure. However, the scope of the present disclosure is not limited to specific described aspects. Aspects of the present disclosure can take the form of an entirely hardware aspect, an entirely software aspect (including firmware, resident software, micro-code, etc.) or an aspect combining software and hardware aspects that can all generally be referred to herein as a “component,” “circuit,” “module” or “system.” Furthermore, aspects of the present disclosure can take the form of a computer program product embodied in one or more computer readable medium(s) having computer readable program code embodied thereon.

As used herein, a phrase referring to “at least one of” or “one or more of” a list of items refers to any combination of those items, including single members. As an example, “at least one of: a, b, or c” is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples of a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium can be any tangible medium that can contain, or store a program.

The flowchart and block diagrams in the Figures illustrate the architecture, functionality and operation of possible implementations of systems, methods and computer program products according to various aspects. In this regard, each block in the flowchart or block diagrams can represent a module, segment or portion of code, which comprises one or more executable instructions for implementing the specified logical function(s). In some alternative implementations the functions noted in the block can occur out of the order noted in the figures. For example, two blocks shown in succession can, in fact, be executed substantially concurrently, or the blocks can sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

What is claimed is:

1. A system comprising:

a device of a user;

a first sensor coupled to the device;

a second sensor coupled to the device; and one or more processors coupled to the device, the one or more processors, individually or collectively, being configured to:

receive, at the first sensor, a first audio signal with a first degradation;

receive, at the second sensor, a second audio signal with a second degradation, wherein the first degradation is different than the second degradation; and determine an output audio signal by using a trained machine-learning model to determine a first mask for the first audio signal and a second mask for the second audio signal, wherein the first mask is configured to at least partially denoise the first audio signal and the second mask is configured to at least partially denoise the second audio signal.

2. The system of claim 1, wherein the first sensor comprises a microphone outside the device and the second sensor comprises:

a feedback microphone;

a voice band accelerometer; or an inertial measurement unit.

3. The system of claim 1, wherein the one or more processors, individually or collectively, are further configured to determine the output audio signal by:

applying the first mask to the first audio signal to produce a denoised first audio signal;

applying the second mask to the second audio signal to produce a denoised second audio signal; and summing the denoised first audio signal and the denoised second audio signal to produce the output audio signal.

4. A method for audio signal processing in a device of a user, the method comprising:

receiving, at a first sensor coupled to the device, a first audio signal with a first degradation;

receiving, at a second sensor coupled to the device, a second audio signal with a second degradation, wherein the first degradation is different than the second degradation; and determining an output audio signal by using a trained machine-learning model to determine a first mask for the first audio signal and a second mask for the second audio signal, wherein the first mask is configured to at least partially denoise the first audio signal and the second mask is configured to at least partially denoise the second audio signal.

5. The method of claim 4, wherein the second sensor comprises:

a feedback microphone;

a voice band accelerometer; or an inertial measurement unit.

6. The method of claim 5, wherein the first sensor comprises a microphone outside the device.

7. The method of claim 4, wherein determining the output audio signal further comprises:

applying the first mask to the first audio signal to produce a denoised first audio signal;

applying the second mask to the second audio signal to produce a denoised second audio signal; and summing the denoised first audio signal and the denoised second audio signal to produce the output audio signal.

8. The method of claim 4, further comprising preprocessing the second audio signal, wherein the preprocessing comprises effectively removing a non-user speech component of the second audio signal.

9. The method of claim 4, wherein the first audio signal and the second audio signal each comprise a speech component originating from the user.

10. The method of claim 4, wherein the device comprises a wearable device.

11. A non-transitory computer-readable medium comprising computer-executable instructions that, when executed by one or more processors of a device of a user, cause the device to perform a method for audio signal processing, the method comprising:

receiving, at a first sensor coupled to the device, a first audio signal with a first degradation;

receiving, at a second sensor coupled to the device, a second audio signal with a second degradation, wherein the first degradation is different than the second degradation; and determining an output audio signal by using a trained machine-learning model to determine a first mask for the first audio signal and a second mask for the second audio signal, wherein the first mask is configured to at least partially denoise the first audio signal and the second mask is configured to at least partially denoise the second audio signal.

12. The non-transitory computer-readable medium of claim 11, wherein the first sensor comprises a microphone outside the device and the second sensor comprises:

a feedback microphone;

a voice band accelerometer; or an inertial measurement unit.

13. The non-transitory computer-readable medium of claim 11, wherein determining the output audio signal further comprises:

applying the first mask to the first audio signal to produce a denoised first audio signal;

applying the second mask to the second audio signal to produce a denoised second audio signal; and summing the denoised first audio signal and the denoised second audio signal to produce the output audio signal.

* * * * *